United States Patent
Kilduff et al.

(10) Patent No.: US 8,894,042 B2
(45) Date of Patent: Nov. 25, 2014

(54) AERATOR FOR POURING WINE INTO A WINE GLASS

(75) Inventors: Edward Kilduff, New York, NY (US); Adam Paskow, New York, NY (US); Norah Joffroy, New York, NY (US)

(73) Assignee: Taylor Precision Products, Inc., Oak Brook, IL (US)

( * ) Notice: Subject to any disclaimer, the term of this patent is extended or adjusted under 35 U.S.C. 154(b) by 261 days.

(21) Appl. No.: 13/368,700

(22) Filed: Feb. 8, 2012

(65) Prior Publication Data
US 2012/0201942 A1    Aug. 9, 2012

Related U.S. Application Data

(60) Provisional application No. 61/440,851, filed on Feb. 8, 2011.

(51) Int. Cl.
| | |
|---|---|
| *B01F 3/04* | (2006.01) |
| *A47G 19/22* | (2006.01) |
| *B01F 13/00* | (2006.01) |
| *C12H 1/14* | (2006.01) |

(52) U.S. Cl.
CPC ........ *A47G 19/2205* (2013.01); *B01F 3/04751* (2013.01); *B01F 13/003* (2013.01); *C12H 1/14* (2013.01); *A47G 2400/045* (2013.01); *B01F 2215/0072* (2013.01)
USPC ............... 261/4; 261/115; 426/474; 99/323.1

(58) Field of Classification Search
USPC ........... 261/4, 6, 115, 116; 426/474; 99/323.1
See application file for complete search history.

(56) References Cited

U.S. PATENT DOCUMENTS

| | | | | |
|---|---|---|---|---|
| 5,293,912 | A | * | 3/1994 | Wildash et al. ................ 141/344 |
| 8,430,023 | B2 | * | 4/2013 | Hynes .......................... 99/323.1 |

* cited by examiner

Primary Examiner — Robert A Hopkins
(74) Attorney, Agent, or Firm — Brooks Kushman P.C.

(57) ABSTRACT

A wine aerator for pouring wine from a wine container such as a wine bottle into a receiver such as a wine glass. The wine aerator has a large mouthed vessel into which the wine is poured from any wine container and the wine passes through the vessel to an outlet having a plurality of radial holes to break up the flow of wine into small discrete flows to carry out the aeration process. The wine aerator has a base that is affixed to the vessel and has a plurality of outwardly extending projections that are dimensioned so as to contact the rim of a wine glass to position the wine aerator atop of the wine glass while the wine aerator is being used. The wine aerator is inexpensively constructed and has no moving parts where leakage could occur.

20 Claims, 4 Drawing Sheets

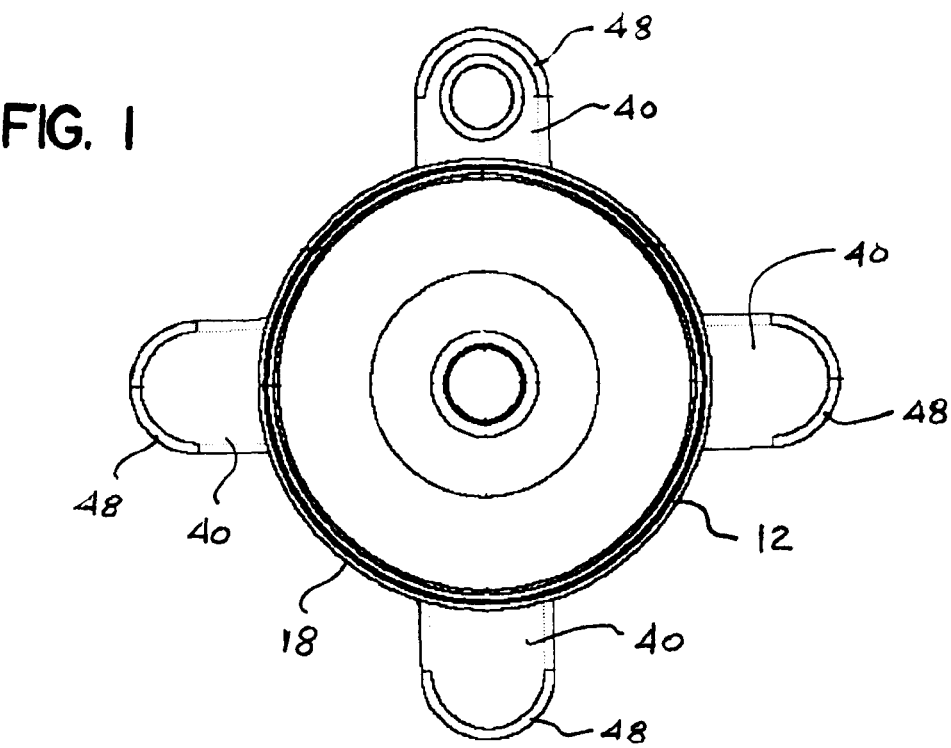
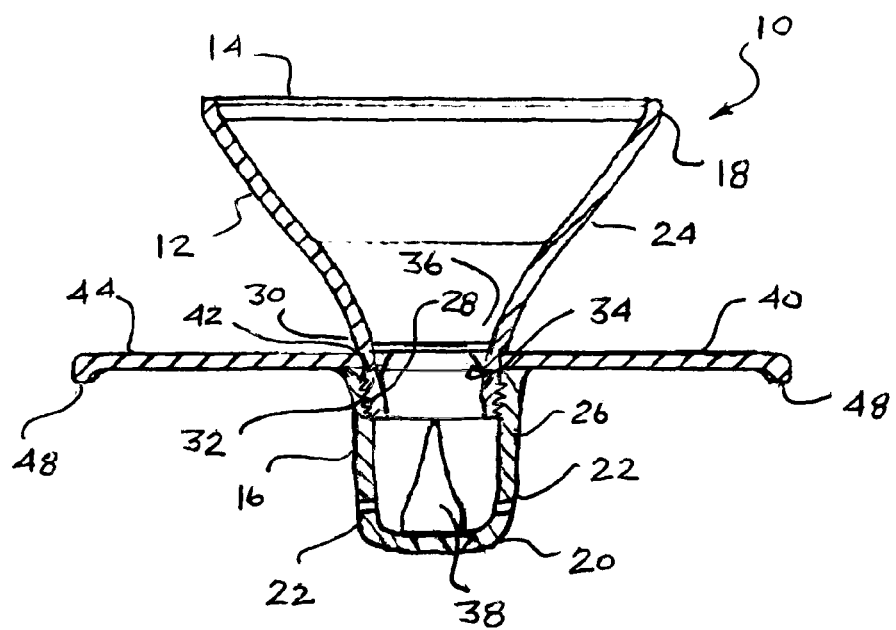

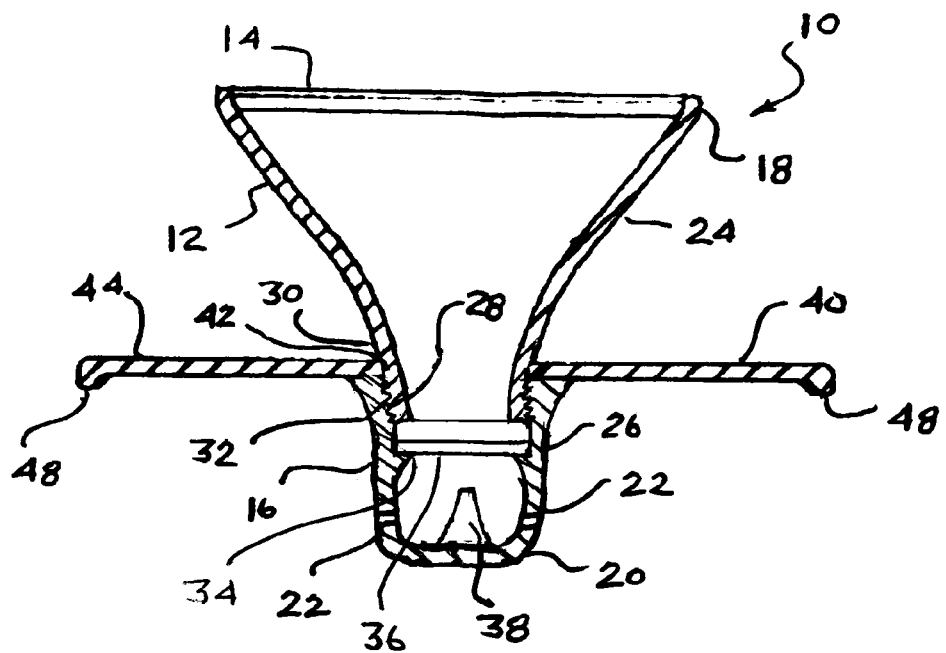

AERATOR FOR POURING WINE INTO A WINE GLASS

RELATED APPLICATION

The present application claims the benefit under 35 U.S.C. §119 of U.S. Provisional Application Ser. No. 61/440,851 filed Feb. 8, 2011. The content of said provisional application is hereby incorporated by reference in its entirety.

BACKGROUND

The present invention relates to an aerator for providing aeration to a wine, and, more particularly, to a wine aerator that can be located atop of an individual wine glass to enable a user to pour wine through the wine aerator into the glass and be aerated as the wine enters the glass.

Generally it is well known that the aeration of red wines improves the flavor and aroma. One traditional means of aeration of wine was to allow the wine to "breathe" such that the wine is allowed to stand for a period of time in contact with air to aerate. As such, the wine typically would be poured into a container having a large mouth in order to contact a large wine surface with the air for a period of time.

A downside, however, of letting wine breath or passively contact the air is that such type of aeration takes time. The aeration of wine simply standing in a wine glass or other container can take up to an hour or more for the aeration process to reach the desired level of aeration of the wine. Therefore, at certain occasions, such as dining at a restaurant, it is not always possible to let the wine sit, after uncorking, for a sufficient period of time to fully carry out the aeration process.

There are currently known, certain devices that carry out the aeration process rapidly such that the need to allow the wine to stand for a period of time is eliminated. Such devices allow the aeration process to take place immediately as the wine is poured from the wine bottle into a receiver, such as a wine glass or other wine receptacle.

Some of such current aeration devices are inserted into the opening in the wine bottle upon uncorking the bottle and the wine is aerated as it is poured out of the bottle. One difficulty, however, of such wine aerators is that the aerator interfits into a standard wine bottle and, while that may be acceptable in many circumstances, there are times that a non-standard bottle is used or the wine has already been poured into some vessel, such as a decanter, and therefore the wine aerator cannot be interfitted in a fluid tight manner into the non-standard wine containers.

Other aerators require the aeration of a total bottle of wine at a time and cannot be used on a glass by glass basis. Such "bottle" aerators are, again, suitable where the intention is to consume the entire bottle of wine at a particular sitting, however, the "bottle" type aerators are not convenient where the user only wants to aerate one glass of wine for immediate consumption and thereafter re-cork the bottle for subsequent use at a later time.

Other examples of aerators are complex and are therefore expensive, or may have moving components that require a seal between moving parts which are susceptible to wear and ultimately, eventual leaking between the moving parts. Of the latter type, the wine aerator shown and described in U.S. Patent Application Publication US 2010/0025867 of Benton et al has a moving pipe, and therefore a seal is necessary along the moving pipe, thereby adding to the cost of manufacture and assembly. With a seal between two moving components, there is also the potential for wear of the seal with the consequent leakage of wine from the aerator.

It would therefore be advantageous to have a wine aerator that overcomes the inherent difficulties and drawbacks associated with the aforementioned wine aerators and which is relatively easy to construct and therefore is inexpensive and yet provides the needed aeration to the wine on a glass by glass basis.

SUMMARY OF THE INVENTION

Accordingly, the present invention relates to a wine aerator that can be used to provide an immediate aeration of wine being poured from a wine container into a receiver, such as a wine glass. With the present invention, the wine aerator can be used with any type of wine container and is not limited to the use of a standard wine bottle that requires some type of seal between the wine container and the wine aerator.

As such, with this invention, the wine may be poured into a vessel having an inlet end and an outlet end such that the wine can pass between the inlet and the outlet directly into a wine glass, whereby the wine aerator can be used on a glass by glass basis; that is, only the amount of wine that is intended to be consumed need be aerated at a given time.

The vessel of the wine aerator can be of a variety of shapes and sizes with the outlet having a plurality of radial openings to disperse the wine and cause it to flow directly into the wine glass while forming a multiplicity of small streams, thereby enhancing the aeration. The inlet is and generally defines a wide rim that facilities the pouring of the wine into the wine aerator without loss of fluid due to spilling or other escape of the wine therefrom.

The present wine aerator also features a base that extends outwardly from the vessel and is dimensioned to allow the wine aerator to be placed atop of a wine glass with the base contacting the upper rim of the wine glass. The base may be detachably attachable to the remainder of the aerator as illustrated herein, and can have a plurality of projections or arms, that extend radially outward from the vessel when in place to rest on the rim of a wine glass or the like, and a center opening that interfits onto the vessel.

In one exemplary embodiment, the vessel is made up of two components that are detachably attached to each other, and that when attached, are in fluid tight engagement. In an illustrated embodiment described herein, the components are threadedly affixed to each other, and the circular opening of the base fits over one of the components. As the components are screwed together, the base is sandwiched between the two components to removably affix the base to the vessel. In an alternate exemplary embodiment, the base can be snap-fitted onto the vessel by the cooperation of the circular opening of the base into an annular groove formed in the outer surface of the vessel.

As a further feature, there may be a sediment screen that removes sediment from the wine passing through the wine aerator and there may be a diverter that extends upwardly from the closed bottom of the vessel in order to prevent the sediment screen from reaching a position where it could impede the flow of wine through the radial openings if the sediment screen were to become inadvertently dislodged from its normal position.

As a yet further feature of the aerator of the invention, the aerator may be constructed simply and inexpensively, and has no moving parts that require seals and therefore no movable mating surfaces that could be susceptible to wear and eventual leakage.

These and other features and advantages of the present invention will become more readily apparent during the following detailed description taken in conjunction with the drawings herein.

BRIEF DESCRIPTION OF THE DRAWINGS

FIG. 1 is a top view of the wine aerator of the present invention;

FIG. 2A is side, cross-sectional view of the wine aerator of FIG. 1;

FIG. 2B is a side, cross-section view similar to that of FIG. 2A, illustrating an alternate embodiment of the wine aerator of the invention;

DETAILED DESCRIPTION OF THE INVENTION

Figure 3:
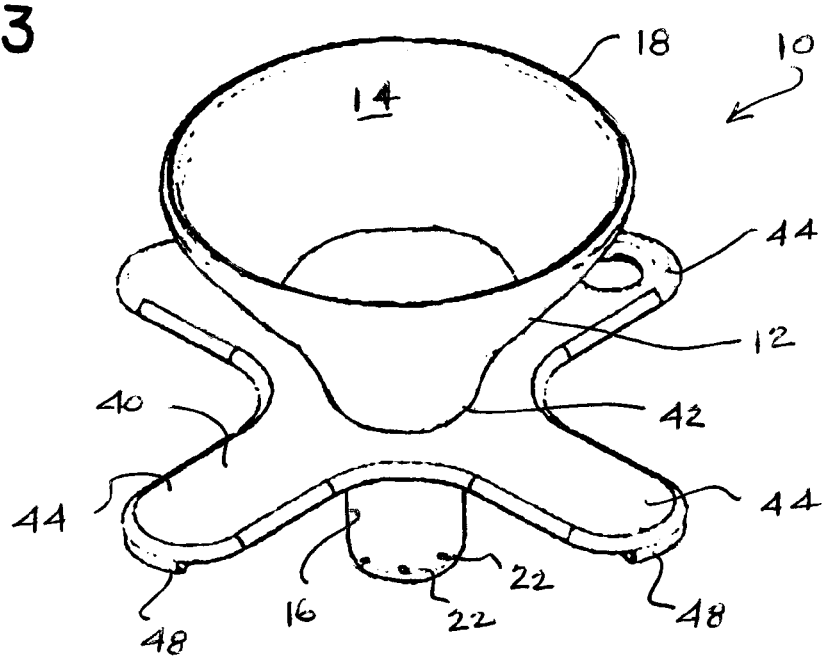
FIG. 3 is a perspective view of the wine aerator of FIG. 1.

Referring now to FIGS. 1-3, there is shown, respectively, a top view, side cross sectional views and a perspective view of a wine aerator 10 constructed in accordance with the present invention. As can be seen, the wine aerator 10 comprises a generally funnel-shaped vessel 12 that has a large diameter inlet end 14 and a reduced diameter outlet end 16. The inlet end 14 of the vessel 12 has a circular rim 18 and the overall wine aerator 10, in the exemplary embodiment of FIGS. 1-3, is shaped like an upward cone, similar to a martini glass, terminating in the upwardly facing circular rim 18 and tapering downwardly to the outlet end 16 that has a reduced diameter and that as illustrated, may be generally cylindrical in shape and defines a closed bottom 20. The vessel 12 can be constructed of a molded plastic material.

The outlet end 16 of the vessel 12 has a plurality of radial openings 22 that communicate between the interior of the vessel 12 and the exterior of the vessel 12. In an exemplary embodiment, there are 6 radial openings 22, however, there can be a greater or lesser number of radial openings 22 consistent with the spirit of the present invention.

In the exemplary and non-limiting embodiment depicted in FIGS. 1-3, the vessel 12 may be comprised of an upper vessel body 24 and a lower cap 26. As illustrated, upper vessel body 24 is detachably attached to lower cap 26, whereby such attachment is fluid tight. In the illustrated embodiment, vessel body 24 tapers to a diameter that corresponds to that of lower cap 26, and at that location is releasably affixed thereto. As depicted, the adjacent ends of vessel body 24 and lower cap 26 are fastened to each other by threads 28 formed at the lower end 30 of the upper vessel body 24 that mate with threads 32 formed in the corresponding adjacent end of lower cap 26. As a consequence, the lower cap 26 is readily removable from the upper vessel body 24 for cleaning and the like. In such embodiment, the radial openings 22 are formed in the lower cap 26 at a location distal to the threaded end thereof.

As can also be seen in the embodiment of FIG. 2A, an annular ledge 34 may be formed in the internal surface of the upper vessel body 24 of the vessel 12 to provide a support and a resting place for a sediment screen 36 that serves to remove sediment from the wine as that wine passes through the wine aerator 10. The presence of the sediment screen 36 is optional and may or may not be present in any particular wine aerator 10. In the alternate embodiment of FIG. 2B, it can be seen that the annular ledge 34 is formed in the lower cap 26.

Extending upwardly from the closed bottom 20 is a further optional feature in the form of a upwardly tapered projection or diverter 38, that serves to prevent the sediment screen 36 from reaching the closed bottom 20 of the wine aerator 10 in the event the sediment screen 36 becomes inadvertently dislodged from its mounted position atop of the annular ledge 34. The diverter 38 stops the sediment screen 36 as it moves downstream so that the diverter 38 cannot reach the radial openings 22 and occlude the flow of wine. In addition, and while not wishing to be bound to any particular theory of operation, it is believed to be possible that the presence of the diverter 38 may enhance the flow of wine from a direct downward path to follow a curved path and exit more efficiently through the radial openings 22.

The aerator 10 includes a base 40 that surrounds the vessel 12 and extends outwardly therefrom. In the exemplary embodiment, the base 40 has an internal circular opening 42 and a plurality of radial projections 44 that extend outwardly away from the vessel 12. The base 40 may be constructed of a molded plastic material or may be a metal such as stainless steel.

As can be seen, particularly in FIGS. 2A and 2B, one means of attaching the base 40 to the vessel 12 is to fit the circular opening 42 of the base 44 over the threads 28 in the upper vessel body 24 such that screwing the lower cap 26 on to the upper vessel body 24 sandwiches the base 40 between the upper vessel body 24 and the lower cap 26, thereby securely affixing the base 40 in position to the vessel 12. As will be seen, there are alternate methods of affixing the base 40 to the vessel 12. In any event, the base 40 is preferably detachable from the vessel 12 by the user to facilitate storage or packaging of the wine aerator 10.

At the distal ends 46 of the radial projections 44, there are formed slightly downturned flanges 48 and the purpose of the downturned flanges 48 will be later explained with respect to FIG. 4.

Figure 4:
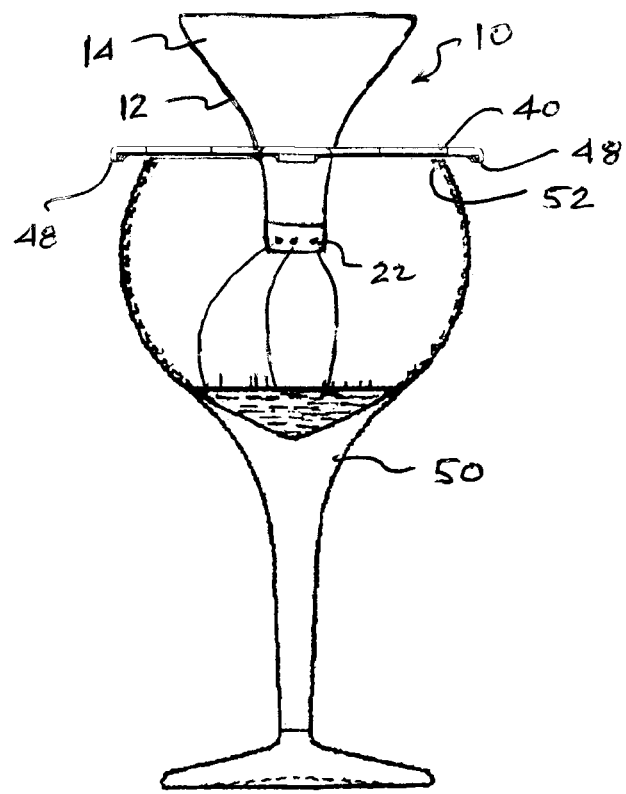
FIG. 4 is a side view illustrating the wine aerator of FIG. 1 in position atop of a wine glass.

Turning then to FIG. 4, there is shown a side view of a wine aerator 10 of the present invention resting atop of a wine glass 50. As can be seen in FIG. 4, the wine aerator 10 is sitting atop of the upper rim 52 of the wine glass 50 and the downturned flanges 48 prevent the wine aerator 10 from sliding off of the wine glass 50.

As such, the wine can be poured from a wine container into the inlet end 14 of the vessel 12 and the wine can pass though the vessel 12 and exit via the radial openings 22 into the wine glass 50, thereby forming a multiplicity of small streams. With that flow of wine, the wine is exposed to a quantity of air within the glass 50 in order to aerate the wine to enhance its flavor in an immediate time frame; that is, the aeration takes place as the wine fills up the wine glass 50.

As can be seen, the wine aerator 10 can be used with any wine container since there is no mating of an inlet of the wine aerator to the opening of a standard wine bottle. In addition, the aeration can be out on a glass by glass basis and, when a wine glass has been filled with the aerated wine, the wine bottle or other container can simply be resealed or re-corked and put away for later use.

Figure 5:
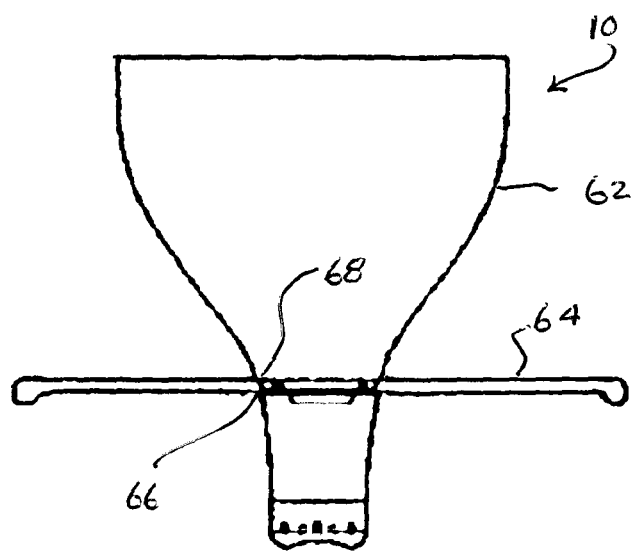
FIG. 5 is a side view of an alternate embodiment of the present invention.

Finally, in FIG. 5, there is shown a wine aerator 54 that is formed in a different shape than the FIG. 1-4 embodiment and, in the embodiment of FIG. 5, the wine glass has a large bowl 56 that can be generally spherical in shape and which transitions upwardly to a cylindrical portion 58 with an upper, circular rim 60. The diameter of the circular rim 60 is about the same as the largest diameter of the large bowl 56. Alternatively, the shape of the wine aerator 54 may have an upper, circular rim 60 with a diameter that is actually smaller than the largest diameter of the large bowl 56.

As can also be seen in the embodiment of FIG. 5, the vessel 62 is a one-piece molded plastic construction and the base 64 is snap fitted onto the vessel 62 by means of the circular opening 66 of the base 64 snapping into a suitably sized annular notch 68 formed in the exterior of the vessel 62. Again, in the manner shown in FIG. 5, the base 64 can be readily affixed to and removed from the vessel 62 by the user.

Those skilled in the art will readily recognize numerous adaptations and modifications which can be made to the wine aerator of the present invention which will result in an improved aeration device for wine, yet all of which will fall within the scope and spirit of the present invention as defined in the following claims. Accordingly, the invention is to be limited only by the following claims and their equivalents.

What is claimed is:

1. A wine aerator comprising:
   a vessel having an inlet end and an outlet end, the inlet end being formed in a bowl-shaped configuration with an opening for receiving wine, the outlet end having a vertically extending, cylindrical wall having a plurality of radial openings adapted to allow wine to pass from the interior of the vessel to a wine receiver,
   the aerator having a base extending outwardly from the vessel and configured to rest atop of the wine receiver when the aerator is introducing wine into the wine receiver.

2. The wine aerator of claim 1 wherein the outlet end of the vessel is generally cylindrical.

3. The wine aerator of claim 1 wherein the base is detachably affixed to the vessel via a snap fit.

4. The wine aerator of claim 3 wherein the vessel has an annular notch and the base has a circular opening and wherein the circular opening is snap fitted to the annular notch of the vessel.

5. The wine aerator of claim 1 wherein the base has a plurality of projections that extend outwardly from the vessel to fit atop of a wine glass.

6. The wine aerator of claim 5 wherein the base has at least three projections to fit the aerator atop of a wine glass.

7. The wine aerator of claim 1 wherein the vessel further includes a sediment screen located within the vessel to remove sediment for the wine passing through the wine aerator.

8. The wine aerator of claim 1 wherein the vessel further includes a diverter located proximate to the outlet end to prevent the sediment screen from moving toward the plurality of radial openings.

9. The wine aerator of claim 1 wherein the outlet end included a closed bottom.

10. The wine aerator of claim 9 further comprising a diverter extending upwardly from the closed bottom.

11. The wine aerator of claim 1 wherein each of the plurality of radial openings is circular-shaped.

12. The wine aerator of claim 1 wherein each of the plurality of radial openings is equally spaced along the circumference of the vertically extending, cylindrical wall.

13. A wine aerator comprising:
   a vessel having an inlet end and an outlet end, the inlet end being formed in a bowl-shaped configuration with an opening for receiving wine, the outlet end having a plurality of radial openings adapted to allow wine to pass from the interior of the vessel to a wine receiver,
   the aerator having a base extending outwardly from the vessel and configured to rest atop of the wine receiver when the aerator is introducing wine into the wine receiver, the base including a plurality of projections and
   the distal end of each of the plurality of projections having an outer flange extending in a direction toward the outlet end.

14. A combination of a wine aerator and wine glass comprising,
   a wine glass having an upper rim,
   an aerator positioned atop of the rim of the wine glass, the aerator comprising a vessel having an inlet end and an outlet end, the inlet end being formed in a bowl-shaped configuration with an opening for receiving the wine, the outlet end having a plurality of radial openings adapted to allow wine to pass from the interior of the vessel to the wine glass,
   the aerator having a base extend outwardly from the vessel and configured to rest atop of the wine glass when the aerator is introducing wine into the wine glass, and
   the vessel including an upper vessel body and a lower cap threadedly interfitted together.

15. The combination of claim 14 wherein the base includes a plurality of projections, each extending toward the wine glass and each having a distal end positioned outside of the rim of the wine glass.

16. The combination of claim 14 further including a sediment screen within the vessel adapted to remove sediment from the wine passing through the wine aerator.

17. The combination of claim 16 further including a diverter located within the vessel and downstream of the sediment screen, the diverter adapted to block movement of the sediment screen toward the radial openings.

18. The combination of claim 14 wherein the vessel comprises a large spherical bowl transitioning upwardly into a upper circular rim.

19. The combination of claim 14 where the base is snap-fitted to the exterior surface of the vessel.

20. A wine aerator comprising:
   a vessel having an inlet end and an outlet end, the inlet end being formed in a bowl-shaped configuration with an opening for receiving wine, the outlet end having a plurality of radial openings adapted to allow wine to pass from the interior of the vessel to a wine receiver,
   the aerator having a base extending outwardly from the vessel and configured to rest atop of the wine receiver when the aerator is introducing wine into the wine receiver, and
   the vessel includes an upper vessel body and a lower cap that is threadedly engaged to the upper vessel body.

* * * * *

UNITED STATES PATENT AND TRADEMARK OFFICE
CERTIFICATE OF CORRECTION

| | | |
|---|---|---|
| PATENT NO. | : 8,894,042 B2 | Page 1 of 1 |
| APPLICATION NO. | : 13/368700 | |
| DATED | : November 25, 2014 | |
| INVENTOR(S) | : Kilduff et al. | |

It is certified that error appears in the above-identified patent and that said Letters Patent is hereby corrected as shown below:

In the claim

Column 6, Line 41, Claim 18:

After "transitioning upwardly into"
Delete "a" and
Insert -- an --.

Signed and Sealed this
Seventeenth Day of March, 2015

Michelle K. Lee
*Director of the United States Patent and Trademark Office*